United States Patent
Li et al.

(10) Patent No.: US 7,343,468 B2
(45) Date of Patent: Mar. 11, 2008

(54) METHOD AND APPARATUS FOR STORAGE PROVISIONING AUTOMATION IN A DATA CENTER

(75) Inventors: Michael L. Y. Li, Toronto (CA); Bala Rajaraman, Cary, NC (US); Prasenjit Sarkar, San Jose, CA (US); David G. Van Hise, Tucson, AZ (US); Zhe Xu, North York (CA)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/106,398

(22) Filed: Apr. 14, 2005

(65) Prior Publication Data

US 2006/0236068 A1 Oct. 19, 2006

(51) Int. Cl.
G06F 12/00 (2006.01)

(52) U.S. Cl. .............................. 711/203; 711/173; 711/4

(58) Field of Classification Search ................ 711/173, 711/203, 4
See application file for complete search history.

(56) References Cited

U.S. PATENT DOCUMENTS

| | | | |
|---|---|---|---|
| 6,446,209 B2 | 9/2002 | Kern et al. ................ 713/193 |
| 6,606,690 B2 * | 8/2003 | Padovano ................... 711/148 |
| 6,704,838 B2 | 3/2004 | Anderson .................... 711/114 |
| 7,107,385 B2 * | 9/2006 | Rajan et al. .................... 711/4 |
| 2002/0103889 A1 * | 8/2002 | Markson et al. ............ 709/223 |
| 2002/0120741 A1 * | 8/2002 | Webb et al. ................ 709/225 |
| 2002/0156987 A1 * | 10/2002 | Gajjar et al. ................ 711/203 |
| 2002/0174306 A1 * | 11/2002 | Gajjar et al. ................ 711/148 |
| 2003/0079014 A1 * | 4/2003 | Lubbers et al. ............. 709/225 |
| 2004/0098383 A1 | 5/2004 | Tabellion et al. .............. 707/3 |

OTHER PUBLICATIONS

Yang et al., "Towards Efficient Resource on-Demand in Grid Computing", ACM Digital Library, 2001, pp. 37-43.
Papavassiliou et al., "From service configuration through performance monitoring to fault detection: implementing an integrated and automated network maintenance platform for enhancing wide area transaction access services", International Journal of Network Management, 2000, 10:241-259.
Alvarez et al., "MINERVA: An Automated Resource Provisioning Tool for Large-Scale Storage Systems", ACM Transactions on Computer Systems, vol. 19, No. 4, Nov. 2001, pp. 483-518.

* cited by examiner

Primary Examiner—Matthew Kim
Assistant Examiner—John P Fishburn
(74) Attorney, Agent, or Firm—Duke W. Yee; Jeffrey S. LaBaw; Catherine K. Kinslow

(57) ABSTRACT

A method, apparatus, and computer instructions are provided for storage provisioning automation in a data center. A storage manager is provided in the present invention to facilitate end-to-end deployment of storage resources for a server in the data center. The storage manager includes functionalities of a volume manager, file system, and physical volumes. In addition, a hierarchical structure is provided by the present invention to specify configuration data for a volume container. The hierarchical structure includes volume container settings, which includes physical volume settings and logical volume settings linked through data partition settings. For SAN volumes, storage multipath settings and data path settings are included in the structure. File system settings and mounting settings are also included to mount a file system once it is created.

6 Claims, 5 Drawing Sheets

METHOD AND APPARATUS FOR STORAGE PROVISIONING AUTOMATION IN A DATA CENTER

BACKGROUND OF THE INVENTION

1. Technical Field

The present invention relates to an improved data center. In particular, the present invention relates to provisioning storage in a data center. Still more particularly, the present invention relates to storage provisioning automation in a data center with a storage manager.

2. Description of Related Art

In a data center environment, storage provisioning is assigning of storage to a number of resources, including hardware and software resources. Examples of resources include storage area network (SAN) fabric and volume managers. SAN is a high-speed subnetwork of shared storage devices. A storage device is a machine that stores data in a disk or disks. SAN enables servers to quickly access data from the subnetwork of the shared storage devices. A volume manager is a software tool that allows storage drive space to be added or expanded on the fly without system reboots or shutdowns. With a volume manager, the physical drivers or hard disks are organized into volume groups with logical volumes in each of the volume groups. By keeping the hardware and software separate, drive changes can be made without shutdown and reboot. Thus, data may be moved to a different location while the system is running.

Existing storage provisioning solutions manage SAN fabric resources and volume manager resources separately. Volume manager or software storage provisioning is not integrated with the SAN fabric storage provisioning at the backend. Thus, software storage provisioning is managed from a switch or a SAN subsystem at the backend. This lack of integration makes defining software storage requirements difficult, because these solutions may be vendor specific.

In addition, existing storage provisioning solutions do not provide an end-to-end solution to servers that require creation and mounting of a file system for the SAN storage volumes to be usable. Furthermore, existing storage provisioning solutions do not handle direct access storage devices (DASDs), which are hard disks located on the servers. Currently, storage configuration for DASDs is managed through local storage.

Therefore, it would be advantageous to have an improved method for storage provisioning automation in a data center that facilitates storage provisioning to servers regardless of the type of storage devices. It would also be advantageous to have an improved method that makes a file system available for subsequent software installation or data storage.

SUMMARY OF THE INVENTION

The present invention provides a method, apparatus and computer instructions for automatically provisioning storage in a data center. A storage manager is provided that retrieves a plurality of volume container settings, creates a volume container using the volume container settings, and adds at least one physical volume to the volume container using the physical volume settings.

In addition, the storage manager adds a server to the volume container, creates at least one logical volume using the logical volume settings, and adds the at least one physical volume to the at least one logical volume using the logical volume settings and disk partition settings.

Furthermore, the storage manager creates at least one file system for the at least one logical volume using file system settings. The storage manager also mounts the at least one file system using file system mount settings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
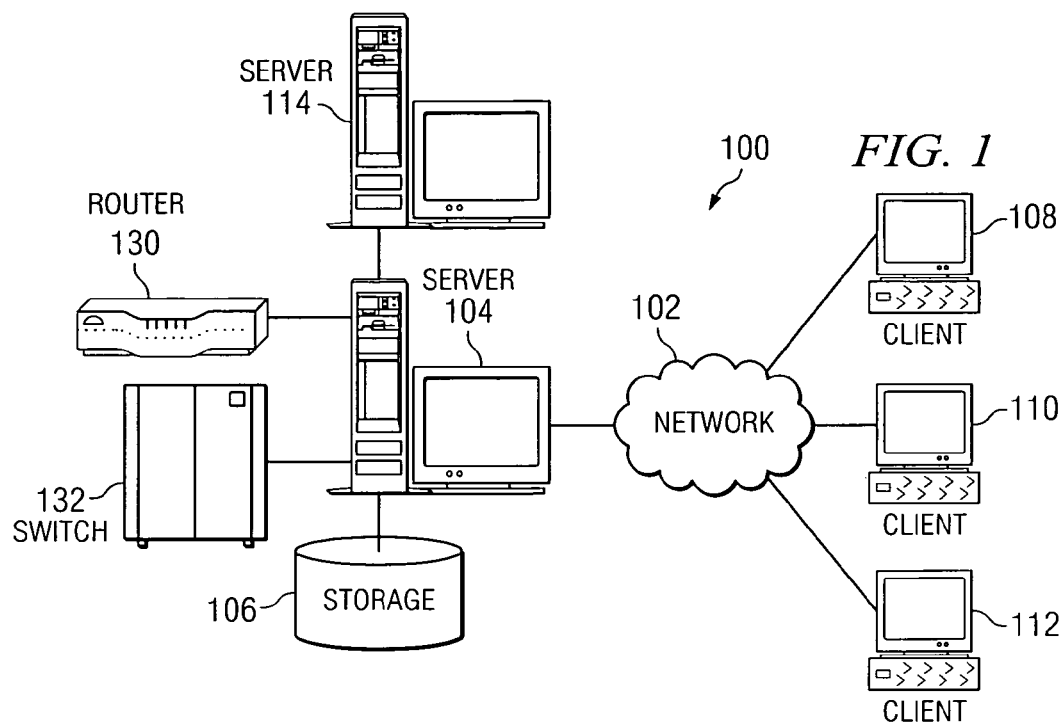
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

Furthermore, server 104 may be connected to other resources, such as router 130, server 114, switch 132 and storage 106. In the present invention, these resources in combination with network data processing system 100 make up a data center.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
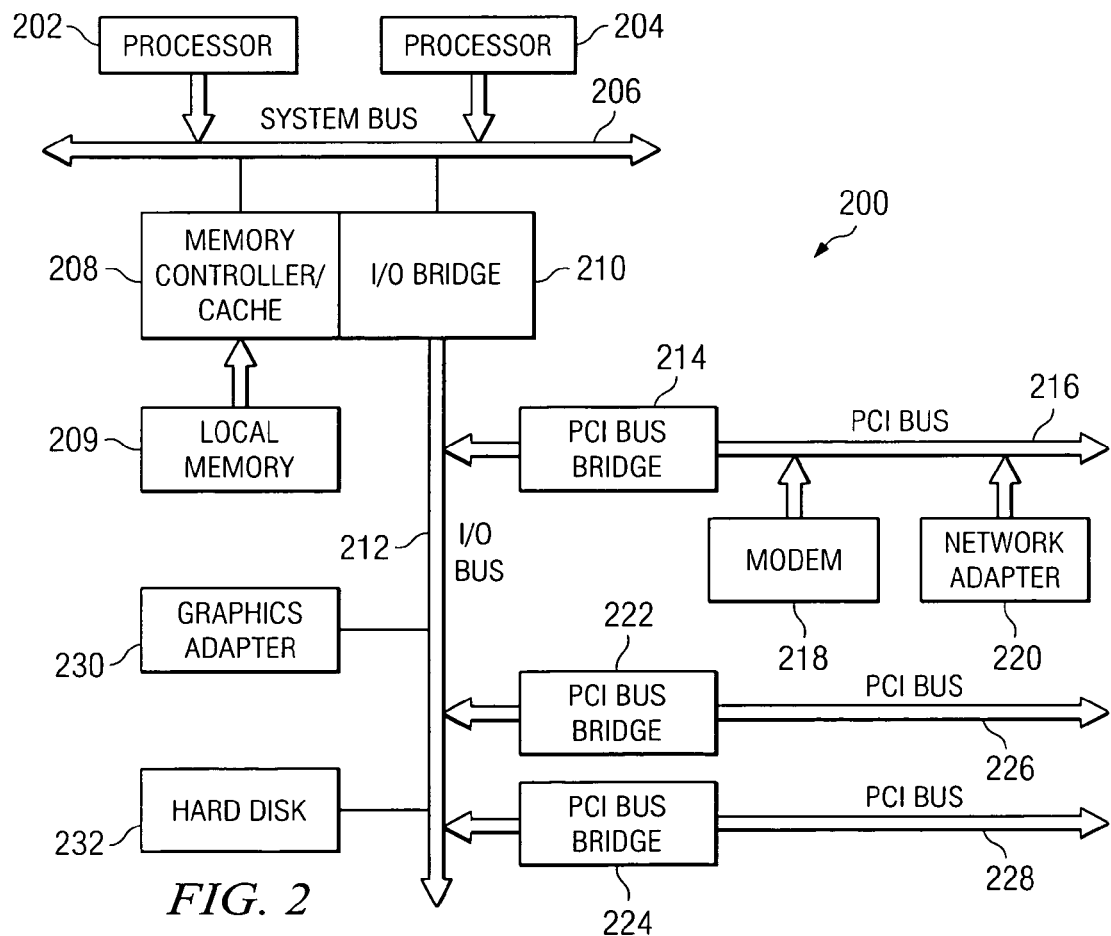
FIG. 2 is a block diagram of a data processing system that may be implemented as a server, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

Figure 3:
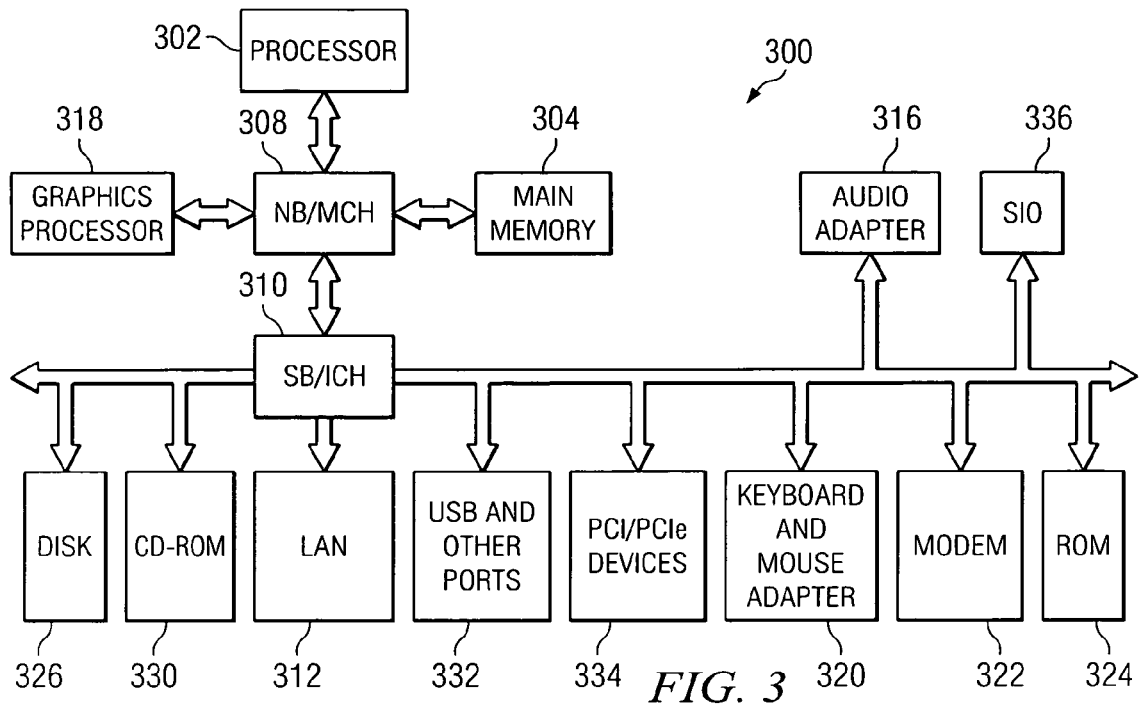
FIG. 3 is a block diagram of a data processing system in which the present invention may be implemented.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4A:
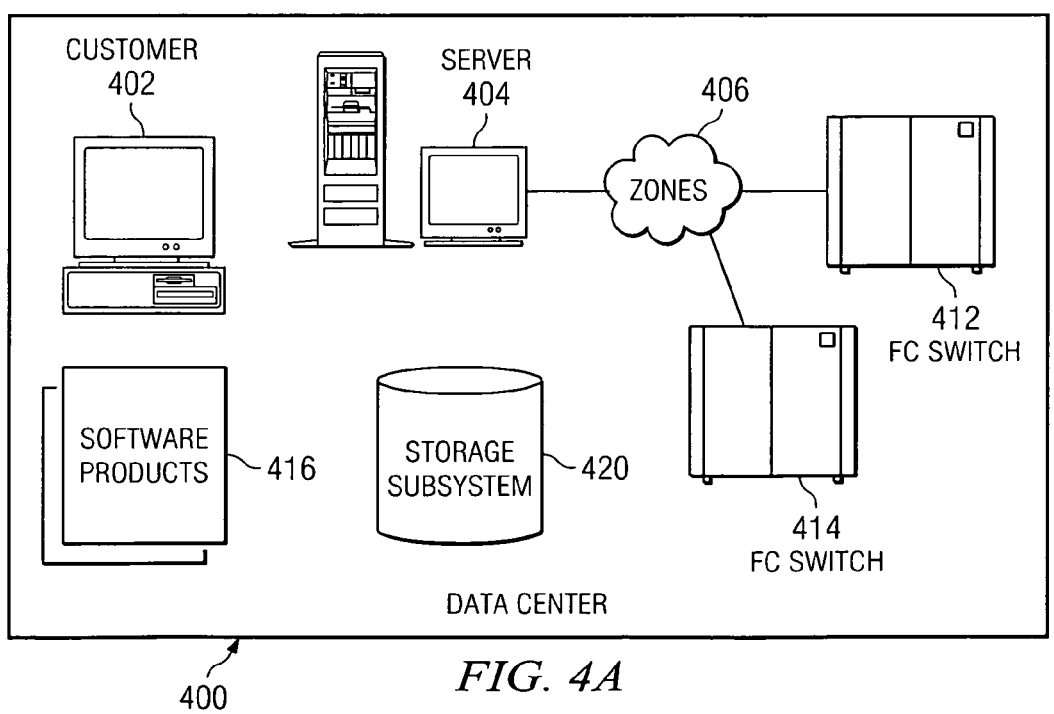
FIG. 4A is a diagram illustrating an exemplary data center, in which the present invention may be implemented.

Turning now to FIG. 4A, a diagram illustrating an exemplary data center is depicted, in which the present invention may be implemented. In this illustrative example, data center 400 includes resources such as customer 402, server 404, zones 406, fiber channel (FC) switches 412 and 414, software products 416, and storage subsystem 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services, or other types of servers.

FC switches 412 and 414 facilitate communications between different devices. Zones 406 are usually configured on a collection of FC switches, such as switches 412 and 414. Software products 416 are applications that may be deployed to a client or a server. Storage subsystem 420 comprises a list of physical volumes which can be used as a data container.

Server 404, storage subsystem 420, FC switches 412 and 414 and zones 406 are all part of a storage area network. Storage area network is further described in FIG. 4B.

Data center 400, as depicted in FIG. 4A, is presented for purposes of illustrating the present invention. Other resources, such as, for example, cluster of servers and switch port, also may be included in data center 400.

Figure 4B:
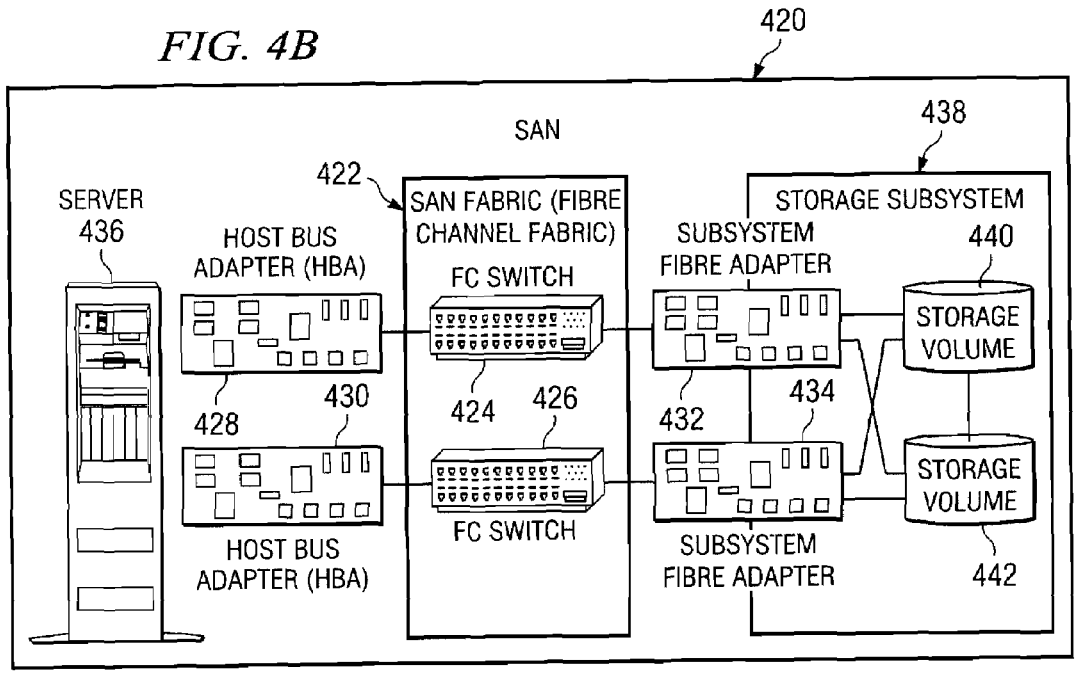
FIG. 4B is a diagram illustrating an exemplary storage area network in which the present invention may be implemented.

Turning now to FIG. 4B, a diagram illustrating an exemplary storage area network is depicted in which the present invention may be implemented. As shown in FIG. 4B, storage area network 420 a fiber channel fabric that comprises fiber channel fabric 422.

Fiber channel fabric 422 includes fiber channel switch ports 424 and 426. A fiber channel switch port is a port on a FC switch that is also a fiber channel port. In this case, both switch ports 424 and 426 are ports on FC switches that are also fiber channel ports.

FC switch ports 424 and 426 facilitate communications between host bus adapters 428, 430 and subsystem fiber adapters 432, 434. Host bus adapters 428 and 430 are fiber channel ports that reside on server 436. Subsystem fiber adapters 432 and 434 are fiber channel ports that reside on storage subsystem 438.

Storage subsystem 438 may be implemented as a SAN disk array or SAN frame. Within storage subsystem 438, there are a number of storage volumes, such as storage volumes 440 and 442., Within each storage volume, there is an aggregation of disks for storing data. Subsystem fiber adapters 432 and 434 may communicate with either storage volume 440 or storage 442 individually.

The present invention provides a method, apparatus, and computer instructions for storage provisioning automation in a data center. The present invention may be implemented in a data center, such as data center 400 in FIG. 4A, or specifically in a storage area network, such as 420 in FIG. 4B. The present invention provides a storage manager object that facilitates storage provisioning to a server. The storage manager enables the capability of handling both SAN storage and DASD devices. For example, both SAN storage and DASD access may be deployed together in a single deployment.

In addition, the storage manager may also manage remote logical volumes in cases where a volume manager is capable of centralizing configurations of external logical volumes for hosts. The hosts are consumers of the external logical volumes. Since volume managers require complex descriptions of expected results for deployment, the present invention also provides a hierarchical structure of configuration data to store configuration data.

The hierarchical structure allows an operation to spin off the handling of certain leaf configurations to other components, such that operational independence may be achieved. The scope of the configuration data may be server-specific, application cluster-specific or server resource pool-specific. This hierarchical structure enables reuse of configurations for homogeneous deployments in existing environments.

Figure 5:
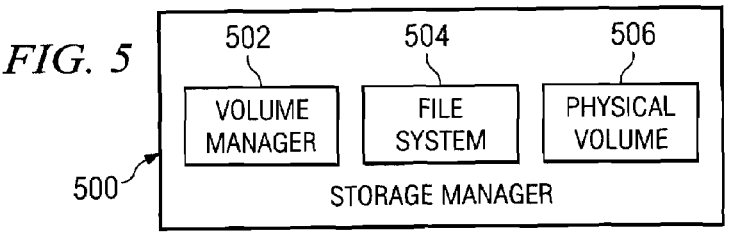
FIG. 5 is a diagram of high level functionalities of a storage manager, in accordance with a preferred embodiment of the present invention.

A volume manager creates and manages logical volumes. The storage manager of the present invention provides the capabilities of the volume manager. In addition, the storage manager is also capable of manipulating file systems and realization of physical volumes. Turning now to FIG. 5, a diagram of high level functionalities of a storage manager is depicted, in accordance with a preferred embodiment of the present invention.

As shown in FIG. 5, storage manager 500 includes functionalities of volume manager 502, file system 504, and physical volume 506. Volume manager 502 creates, removes, and configures volume containers. A volume container includes one or more logical volumes. Volume manager 502 also creates, removes, and configures logical volumes for storage provisioning. In addition, volume manager 502 associates or partitions physical volumes.

File system 504 functionalities include creating, removing, mounting, and unmounting file systems. Physical volume 506 functionalities include realizing and unrealizing a SAN volume as a physical volume. Thus, with the capability of volume manager and physical volumes, storage manager 500 may coordinate operations between physical and logical volume operations, which enables storage manager 500 to assign and unassign storage to and from hosts.

In most storage deployment scenarios, multiple file systems are deployed to a single server. Thus, multiple logical volumes are created on a per volume container basis. In order to specify a configuration for multiple logical volumes, the present invention provides a volume container settings object to include necessary information to perform an end-to-end deployment.

Figure 6:
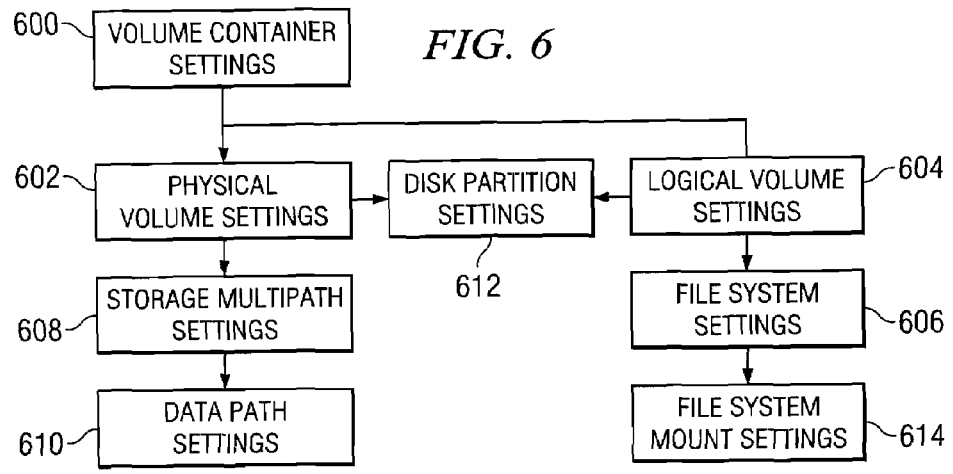
FIG. 6 is a diagram illustrating a hierarchical structure of configuration data for a 'volume container settings', in accordance with a preferred embodiment of the present invention.

Turning now to FIG. 6, a diagram illustrating a hierarchical structure of configuration data for a 'volume container settings' is depicted in accordance with a preferred embodiment of the present invention. As shown in FIG. 6, volume container settings 600 are settings which specify configuration information necessary to build an end-to-end deployment.

Volume container settings 600 are used to create a volume container for physical volumes and logical volumes. Volume container settings 600 is not bound to a specific volume manager, and a decision can be made at run time as to whether to select a remote volume manager for creating the proper volume containers. In this way, configuration information may be reused for different servers, since configuration information is not vendor specific.

Volume container settings 600 include physical volume settings 602 and logical volume settings 604. Physical volume settings 602 specifies what settings volume container settings 600 should include by specifying either an existing local physical volume or maps to a physical volume to be realized in a SAN storage subsystem.

For SAN specific physical volumes, storage multi-path settings 608 and data path settings 610 are required, since SAN storage is not generically created in the SAN. Other storage resources are managed as physical volumes. Storage multi-path settings 608 include settings for SAN resources. Data path settings 610 include connection settings, such as storage network connections between servers and FC-switches and from FC-switches to the storage subsystem.

Logical volume settings 604 include volume container settings, such as volume container settings 600, for creating logical volumes. To create logical volumes, physical volumes are added to logical volumes using disk partition settings 612. Disk partition settings 612 include partition settings of physical volumes, including the number of partitions. Once logical volumes are created, file system settings 606 are used to build a file system for the logical volume.

File system settings 606 include settings for creating a file system for the logical volume, including DASD and SAN volumes. Once a file system is created for the logical volume, file system mount settings 614 are used to mount the file system. A file system is mounted by mapping the file system to a file path like directory, such as C:\, depending on the operating system of the device.

With a hierarchical structure like volume container settings 600, storage provisioning may be facilitated regardless of the type of servers.

Figure 7:
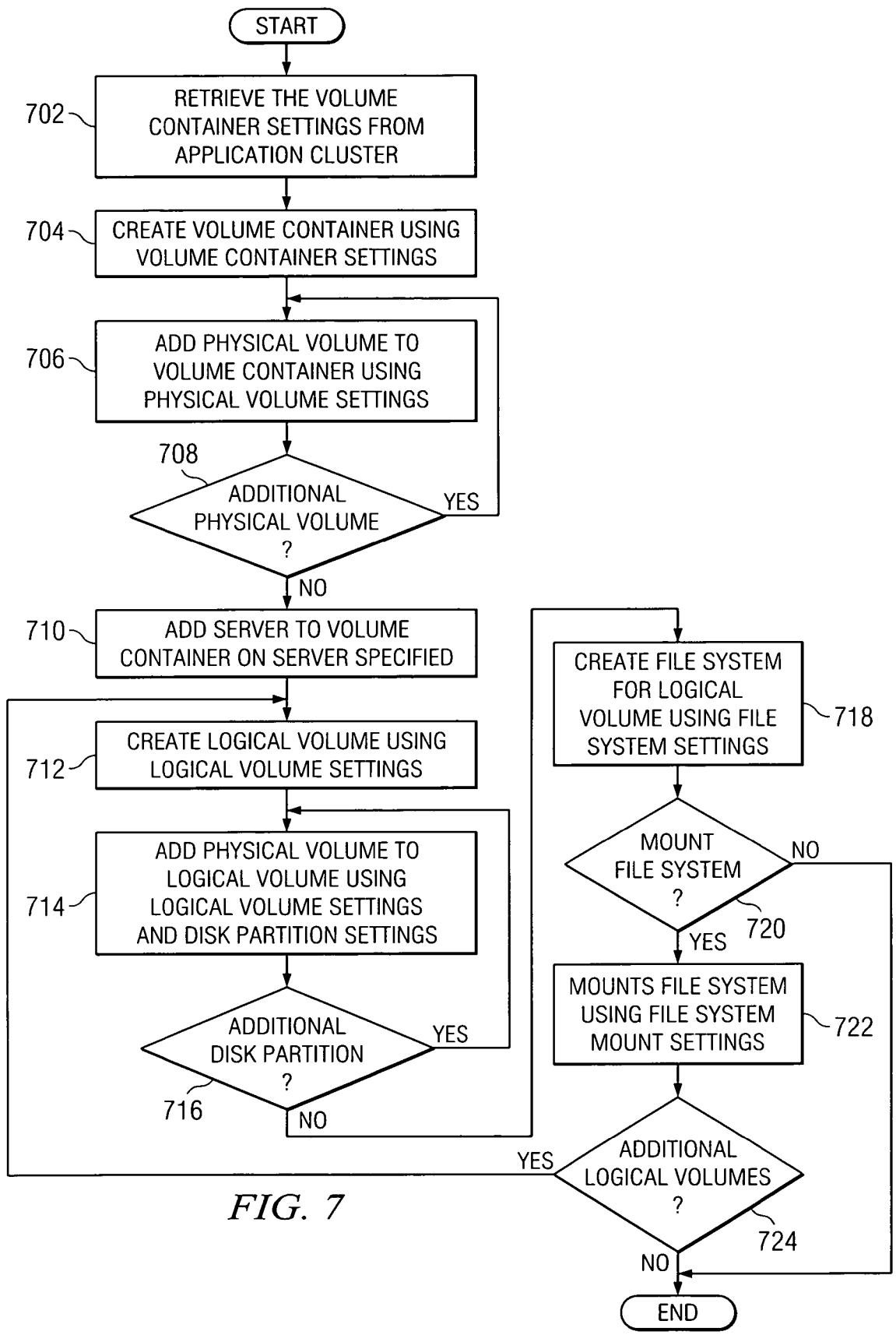
FIG. 7 is a flowchart illustrating an exemplary process for assigning storage to a server in a cluster with specific storage requirements, in accordance with a preferred embodiment.

Turning now to FIG. 7, a flowchart illustrating an exemplary process for assigning storage to a server in a cluster with specific storage requirements is depicted, in accordance with a preferred embodiment. As shown in FIG. 7, the process begins at the start of deployment when the storage manager retrieves the volume container settings from the application cluster (step 702). As described above, volume container settings are not specific to a particular server. Therefore, with volume container settings, different types of storage resources and vendor implementations may be deployed together.

Once the volume container settings are retrieved, a volume container is created using the volume container settings (step 704). Next, a physical volume is added to the volume container using physical volume settings (step 706). For DASD volumes, the physical volume settings will be used to perform a lookup of existing resources to use. For SAN volumes, physical volumes may or may not be realized for SAN storage before the operation begins, because physical volumes are realized before a volume container is created. The realization for SAN volumes is described in further detail in FIG. 8.

After the physical volume is added, a determination is made by the storage manager as to whether additional physical volumes are present (step 708), since multiple physical volumes may be added to a volume container. If additional physical volumes are present, the process returns to step 706 to add the next physical volume. Otherwise, the storage manager adds a server to the volume container (step 710). The server is a resource to which the storage is provisioned. Once the server is added, the storage manager creates a logical volume using the logical volume settings (step 712) and adds the physical volume to the logical volume using both the logical volume settings and the disk partition settings (step 714). Disk partition settings include partition settings of physical volumes.

Next, a determination is made by the storage manager as to whether additional disk partitions are present (step 716), since a logical volume may include one or more disk partitions. If additional disk partitions are present, the process returns to step 714 to add the next physical volume to the logical volume. Otherwise, the storage manager creates a file system for the logical volume using the file system settings (step 718). File system is created for subsequent installation of software or for data storage.

After the file system is created, a determination is made as to whether the file system is to be mounted (step 720). If the file system is not to be mounted, the process terminates thereafter. If the file system is to be mounted, the storage manager mounts the created file systems using the file system mount settings (step 722). Mounting the file system maps the file system to a file path like directory, such as C:\, depending on the operating system.

Finally, after the file system is mounted, a determination is made by the storage manager as to whether additional logical volumes are present (step 724). If additional logical volumes are present, the process returns to step 712 to create additional logical volumes using the logical volume settings. Otherwise, the process terminates thereafter.

Figure 8:
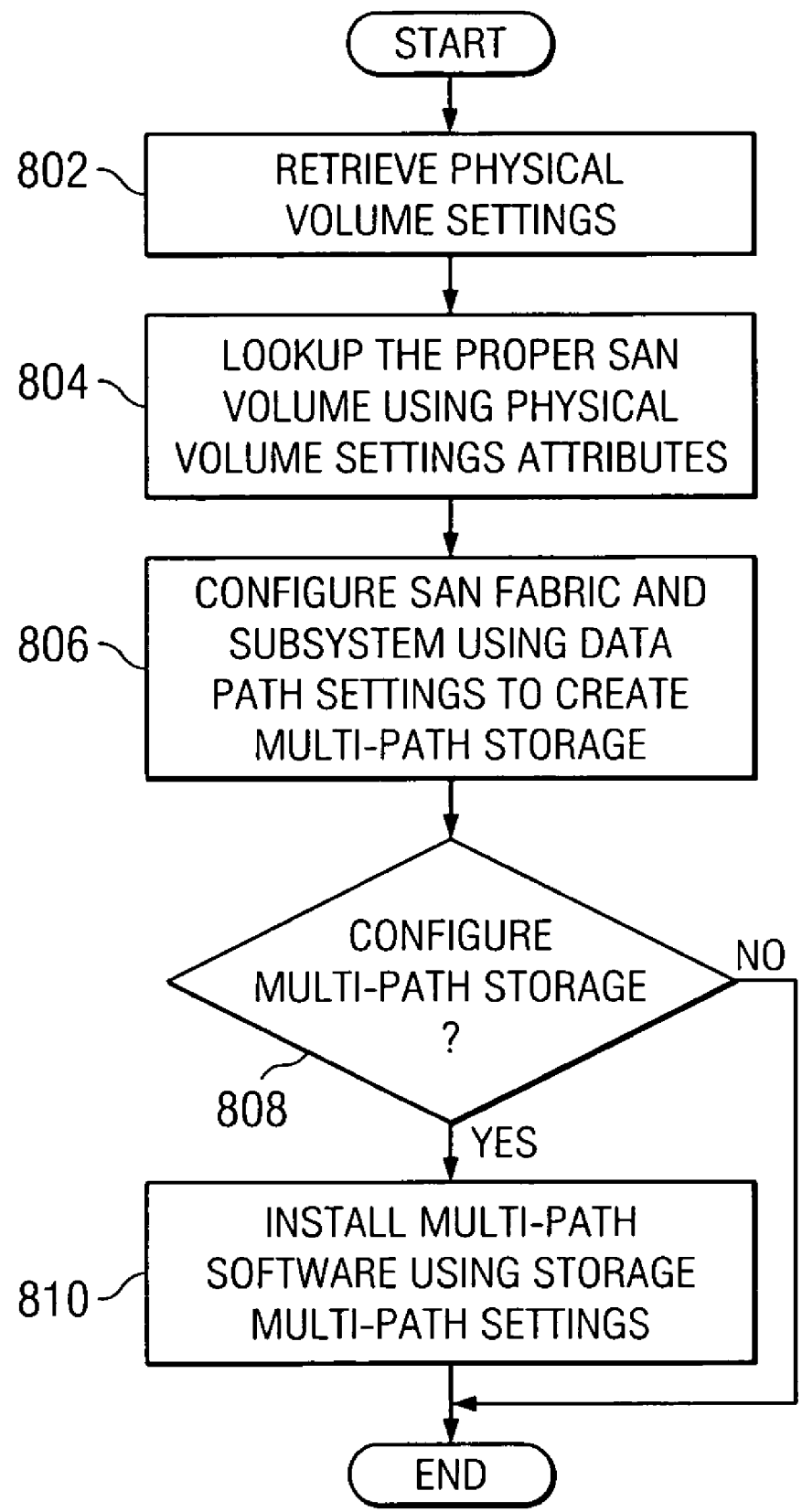
FIG. 8 is a flowchart of an exemplary process for realization of SAN volumes, in accordance with a preferred embodiment of the present invention.

Turning now to FIG. 8, a flowchart of an exemplary process for realization of SAN volumes is depicted in accordance with a preferred embodiment of the present invention. As described above, realization of SAN volumes is required before a volume container is created.

The process begins when the storage manager retrieves the physical volume settings for the SAN resource (step 802). The storage manager then looks up the proper SAN volumes using attributes of the physical volume settings (step 804). Physical volume settings provide settings for locating the back end of the SAN fabric.

After the proper SAN volume is located, the storage manager configures the SAN fabric and subsystem by using the data path settings (step 806), which includes network connection settings from SAN fabric to a switch and from the switch to a storage subsystem. Next, a determination is made by the storage manager as to whether the multi-path storage is to be configured (step 808). Multi-path storage is storage accessible by multiple connections. If multi-path storage is not to be configured, the process terminates thereafter.

If multi-path storage is to be configured, the process continues at step 806 to configure the SAN fabric using the data path settings until all multi-path storage is created. Finally, the storage manager installs the multi-path software using the storage multi-path settings (step 810). Multi-path software is used for the server to communicate with the switch to provide fail safe access of SAN volumes through different connection paths. After the multi-path software is installed, the process terminates thereafter. With the realization of SAN volumes, the server may properly identify storage in the back end.

In summary, the present invention provides a storage manager that facilitates end-to-end deployment of storage resources for a server, such that software installation and data storage may be performed in an automated fashion.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatically provisioning storage in a data center, the method comprising:
   retrieving a plurality of volume container settings, wherein the volume container settings include physical volume settings and logical volume settings;
   creating a volume container using the plurality of volume container settings;
   adding at least one physical volume to the volume container using the physical volume settings;
   adding a server to the volume container, wherein the server includes a plurality of physical volumes;
   creating at least one logical volume using the logical volume settings;
   adding the at least one physical volume to the at least one logical volume using the logical volume settings and using disk partition settings;
   creating at least one file system for the at least one logical volume using file system settings; and
   mounting the at least one file system using file system mount settings;
   wherein the adding step for adding at least one physical volume to the volume container using the physical volume settings further comprises performing a lookup of existing direct access storage devices, if the at least one physical volume is a direct access storage device volume and realizing the at least one physical volume for storage area network storage if the at least one physical volume is a storage area network volume, and wherein the realizing step comprises retrieving the physical volume settings, performing a lookup of storage area network volumes using attributes of the physical volume settings, configuring storage area network fabric and subsystems using data path settings, wherein the data path settings include network connection settings from storage area network fabric to a switch and from the switch to a storage subsystem, and installing multi-path software using storage multi-path settings, wherein the storage multi-path settings facilitate communication between the server and the switch.

2. The method of claim 1, wherein the volume container includes the at least one physical volume of different resources.

3. The method of claim 1, wherein the at least one physical volume includes a direct access storage device and a storage area network storage.

4. The method of claim 1, wherein the disk partition settings include partition settings of the at least one physical volume.

5. The method of claim 1, wherein the mounting step includes mapping the at least one file system to a file path directory on the server.

6. The method of claim 1, wherein the volume container settings, the logical volume settings, the physical volume settings, the file system settings, the file system mount settings, the disk partition settings, the storage multipath settings, and the data path settings are stored in a hierarchical structure.

* * * * *